United States Patent
Servant et al.

(10) Patent No.: US 9,708,931 B2
(45) Date of Patent: Jul. 18, 2017

(54) DEVICE FOR CENTRING AND GUIDING THE ROTATION OF A TURBINE ENGINE SHAFT INCLUDING IMPROVED MEANS FOR RETAINING THE EXTERNAL BEARING RING

(71) Applicant: SNECMA, Paris (FR)

(72) Inventors: Regis Eugene Henri Servant, Vigneux sur Seine (FR); Serge Louis Antunes, Combs la Ville (FR); Julie Bellay, Draveil (FR); Fabrice Cretin, Moret sur Loing (FR); Damien Lourit, Lieusaint (FR)

(73) Assignee: SNECMA, Paris (FR)

(*) Notice: Subject to any disclaimer, the term of this patent is extended or adjusted under 35 U.S.C. 154(b) by 0 days.

(21) Appl. No.: 15/037,889

(22) PCT Filed: Nov. 25, 2014

(86) PCT No.: PCT/FR2014/053020
§ 371 (c)(1),
(2) Date: May 19, 2016

(87) PCT Pub. No.: WO2015/079156
PCT Pub. Date: Jun. 4, 2015

(65) Prior Publication Data
US 2016/0290161 A1    Oct. 6, 2016

(30) Foreign Application Priority Data
Nov. 26, 2013   (FR) .................................... 13 61629

(51) Int. Cl.
*F01D 21/04*     (2006.01)
*F01D 25/16*     (2006.01)
(Continued)

(52) U.S. Cl.
CPC ......... *F01D 25/164* (2013.01); *F01D 21/045* (2013.01); *F16C 27/045* (2013.01);
(Continued)

(58) Field of Classification Search
CPC ..... F01D 25/164; F01D 21/045; F16C 37/045
See application file for complete search history.

(56) References Cited

U.S. PATENT DOCUMENTS 6,540,483 B2 * 4/2003 Allmon .................. F01D 25/16
384/581
9,341,079 B2 * 5/2016 Antunes ................ F01D 21/045
(Continued)

FOREIGN PATENT DOCUMENTS

EP    1 630 357 A2    3/2006
FR    2 960 907 A1    12/2011

OTHER PUBLICATIONS

International Search Report issued Mar. 5, 2015, in PCT/FR2014/053020 filed Nov. 25, 2014.
(Continued)

*Primary Examiner* — Thomas R. Hannon
(74) *Attorney, Agent, or Firm* — Oblon, McClelland, Maier & Neustadt, L.L.P.

(57) ABSTRACT

A device for centring and guiding the rotation of a turbine engine shaft, in which the outer race of a bearing is retained axially upstream and downstream by a retaining mechanism cooperating with a bearing bracket and with a coupling mechanism including elastically deformable mechanism connecting the outer race to the bearing bracket, the retaining mechanism being separate from a protecting ring of the device. A method of assembling such a device is also described. The retaining mechanism is pre-assembled with the coupling mechanism prior to the final assembly of the coupling mechanism with the bearing bracket. The device
(Continued)

and the method have the combined advantages of axially retaining the outer race in two opposing directions and having a particularly straightforward assembly.

11 Claims, 7 Drawing Sheets

(51) Int. Cl.
    *F16C 27/04*     (2006.01)
    *F16C 33/58*     (2006.01)
    *F16C 35/067*     (2006.01)
    *F16C 35/077*     (2006.01)
    *F16C 19/26*     (2006.01)

(52) U.S. Cl.
CPC .......... *F16C 33/581* (2013.01); *F16C 33/586* (2013.01); *F16C 35/067* (2013.01); *F05D 2220/323* (2013.01); *F05D 2230/64* (2013.01); *F05D 2240/54* (2013.01); *F05D 2260/96* (2013.01); *F16C 19/26* (2013.01); *F16C 35/077* (2013.01); *F16C 2360/23* (2013.01)

(56) References Cited

U.S. PATENT DOCUMENTS

| | | |
|---|---|---|
| 2003/0039538 A1 | 2/2003 | Allmon et al. |
| 2006/0045404 A1 | 3/2006 | Allmon et al. |
| 2013/0156574 A1 | 6/2013 | Antunes et al. |
| 2015/0176427 A1* | 6/2015 | Denis .................. F01D 21/045 60/779 |

OTHER PUBLICATIONS

French Search Report issued Jun. 11, 2014, in French Application No. 13 61629 filed Nov. 26, 2013.

* cited by examiner

DEVICE FOR CENTRING AND GUIDING THE ROTATION OF A TURBINE ENGINE SHAFT INCLUDING IMPROVED MEANS FOR RETAINING THE EXTERNAL BEARING RING

TECHNICAL FIELD

The present invention pertains to the field of turbine engines, notably for aircraft, and more particularly relates to a device for centring and guiding the rotation of a turbine engine shaft, including a bearing of the type commonly known as a "flexible bearing". In a bearing of this type, the means for coupling the outer race of the bearing to the bearing bracket include a fastening flange mounted on the bearing bracket and elastically deformable means connecting the outer race of the bearing to the fastening flange.

The invention is notably applicable to bearings dampened by means of a film of oil, also known as "squeeze film".

The invention also relates to a method of assembling such a device.

STATE OF THE PRIOR ART

In a turbine engine, the occurrence of an event such as the loss of a fan blade or the seizing of a bearing through lack of oil leads to very significant loads on the bearings of the turbine engine.

Such loads may bring about breakage of the elastically deformable means connecting the outer race of a bearing of "flexible" type to the flange ensuring the fastening of the bearing on the bearing bracket. These elastically deformable means are in general constituted of a part commonly designated "flexible cage" or "squirrel cage".

When they break, the elastically deformable means cease to ensure the maintaining in place of the outer race of the bearing, whether axially or tangentially. If suitable means are not provided, the roller function is no longer ensured, which brings about a rapid degradation of the bearing and the surrounding parts. The bearing cannot then ensure the operation of the engine, notably in "windmilling" phase.

In order to make it possible to ensure the axial retention of the outer race of the bearing with respect to the bearing bracket even when the elastically deformable means that connect the outer race of the bearing to the bearing bracket are broken, different solutions have been proposed.

A known solution consists in interposing axial retaining means of the outer race between the bearing bracket and an upstream end of the race. These axial retaining means take the form of a plurality of radial legs mounted by bolts on an upstream end of the bearing bracket, and forming axial abutments for an upstream end of the outer race. This technical solution may be criticised in that it causes high bulk and global mass, notably on account of the necessity to extend the outer bearing race upstream, in order to offer an abutment surface to the radial legs borne by the bearing bracket. Effectively, this upstream race extension is justified by the need for the race to extend beyond the protecting ring in which it is housed, with the aim of receiving the radial legs borne by the bearing bracket surrounding the protecting ring.

This upstream extension of the bearing outer race sometimes even proves impossible to realise, on account of problems of congestion in this already very dense area of the turbine engine.

Figure 3:
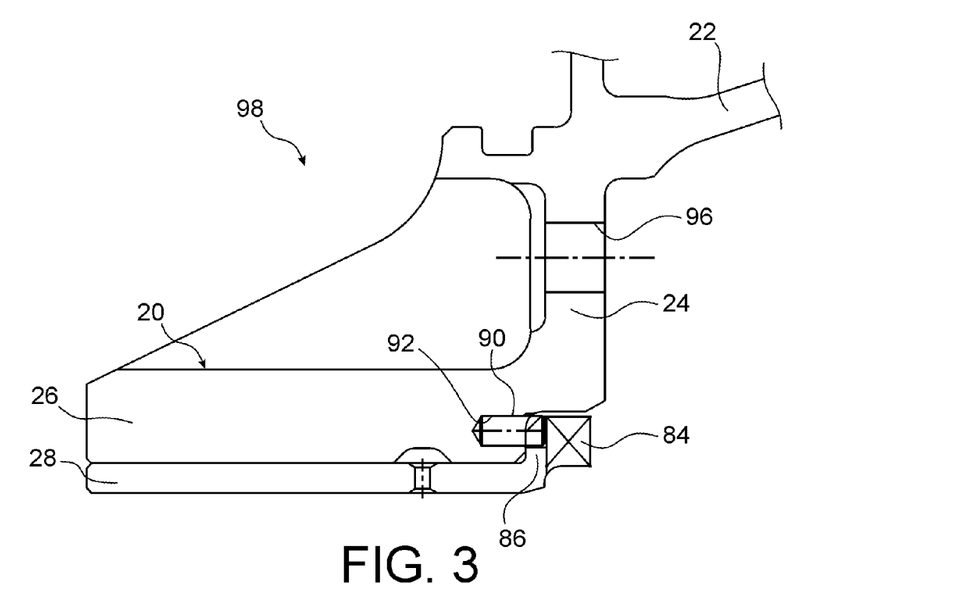
FIG. 3 is a schematic half-view in axial section of a first assembly formed by a bearing bracket and a protecting ring, during the assembly of the device of FIG. 1.

Another solution proposed in the document FR 2960907 consists in ensuring the axial retention of the outer race of a bearing by means of pins engaged jointly in a groove of the outer race and in orifices of a downstream extension of the protecting ring of the bearing (see for example FIG. 3 of the aforementioned document).

Nevertheless, this latter solution requires a complex assembly procedure. In fact, the pins must be mounted along the radial direction going from the inside outwards. The mounting of the pins can only be carried out after having mounted the outer race of the bearing in its support, and the bulk of the latter then complicates the task. Similarly, for dismantling, it is necessary to extract the pins before being able to remove the outer race of the bearing from its bracket, which presents a risk of damaging these elements. Furthermore, to ensure the pins cannot be lost, it is necessary to be able to turn the outer race of the bearing in its support, even though it is already in its final axial position. Such an operation precludes a tight mounting of the outer race in its support, which is however desirable.

DESCRIPTION OF THE INVENTION

The aim of the invention is notably to provide a straightforward, economic and efficient solution to at least a part of these problems.

To this end, the invention provides a device for centring and guiding the rotation of a turbine engine shaft, including:
  a rolling bearing including an outer race;
  a bearing bracket surrounding the outer race;
  a protecting ring interposed between the outer race and the bearing bracket;
  means for coupling the outer race to the bearing bracket, the coupling means including an annular fastening flange mounted on the bearing bracket and elastically deformable means connecting the outer race to the fastening flange; and
  retaining means for axially retaining the outer race in the event of breakage of said elastically deformable means.

According to the invention, the retaining means include:
  first means separate from the protecting ring and having a radially inner part engaged in at least one recess formed in a radially outer surface of the outer race, and a radially outer part that extends projecting radially outwards with respect to the radially outer surface of the outer race so that in the event of breakage of the elastically deformable means, the fastening flange opposes an axial movement of said radially outer part of the first means in a first direction oriented towards the elastically deformable means, and the bearing bracket opposes an axial movement of said radially outer part of the first means in a second direction opposite to the first direction, and
  a retaining element separate from the protecting ring and configured axially opposite the radially outer part of the first means so as to form an abutment opposing the axial movement of the first means in said first direction.

The device according to the invention thus makes it possible to ensure an axial retention of the outer bearing race in the event of breakage of the elastically deformable means, in both directions, while being particularly straightforward to assemble due to the fact that said retaining element which ensures the retention of the first means in the first direction is an element separate from the protecting ring.

Preferably, the retaining element is a retaining ring separate from the protecting ring and having a radially inner part extending at a distance from the outer race and forming an abutment opposing the axial movement of said radially outer part of the first means in said first direction in the event of breakage of the elastically deformable means, and a radially outer part interposed axially between the bearing bracket and the fastening flange.

The retaining ring advantageously has a radially outer end tightly mounted in an annular surface of the fastening flange delimited axially by an annular shoulder of the fastening flange opposing an axial movement of the retaining ring in said first direction.

In a variant, the radially outer part of the retaining ring may be provided with orifices traversed by components for fastening the fastening flange to the bearing bracket.

Furthermore, in a preferred embodiment of the invention, the first means take the form of a plurality of retaining pins each having a radially inner part tightly mounted in a corresponding orifice of the outer race, and a radially outer part protruding from the radially outer surface of the outer race so as to extend axially opposite the radially inner part of the retaining ring.

In this case, the radially outer part of each of the retaining pins is advantageously positioned between two corresponding lugs integral with the bearing bracket, such that the lugs limit the rotation of the outer race in the event of breakage of the elastically deformable means.

In another preferred embodiment of the invention, the first means take the form of an annular element having a radially inner part engaged in an annular groove of the outer race, and a radially outer part protruding from the radially outer surface of the outer race so as to extend axially opposite the radially inner part of the retaining ring.

In yet another preferred embodiment of the invention, the retaining element is said fastening flange, and the first means take the form of a ring formed of at least two ring segments mounted end-to-end circumferentially and having a radially inner part engaged in an annular groove of the outer race, and a radially outer part provided with orifices traversed by components for fastening the fastening flange to the bearing bracket.

The invention also relates to a turbine engine including at least one device of the type described above.

The invention further relates to a method of assembling a device of the type described above, including at least the steps consisting in:

providing a first solid assembly formed by the bearing bracket and the protecting ring mounted beforehand in the latter;

providing the outer race and the coupling means integral with the outer race as well as the retaining element;

moving said first means radially from the outside inwards with respect to an axis of revolution of the outer race, so as to insert said radially inner part of the first means in the or each corresponding recess formed in the outer race, and thereby obtain a second solid assembly including the outer race, the coupling means, the retaining element, and the first means, then moving the second solid assembly with respect to said first solid assembly until the outer race is surrounded by the bearing bracket, then fastening said fastening flange on the bearing bracket.

The first means, and more generally the retaining means, are thus pre-assembled to the coupling means integral with the outer race, so as to form an indissociable assembly, said assembly then being able to be assembled in a conventional manner to said first assembly, in particular to the bearing bracket.

The invention thus offers a particularly straightforward method of assembly.

In addition, the pre-assembly of the retaining means with the coupling means may be carried out by a first entity, such as a manufacturer of separate parts, whereas the final assembly may be carried out by a second entity, such as a turbine engine manufacturer. In this case, the invention allows the second entity to keep a conventional final assembly method.

If need be, the method advantageously includes the step consisting in putting in place the retaining ring around the outer race prior to the step of movement and insertion of the first means in the outer race, such that said radially inner part of the retaining ring is configured axially between at least one part of the fastening flange and the or each recess intended to receive the radially inner part of the first means.

BRIEF DESCRIPTION OF THE DRAWINGS

The invention will be better understood, and other details, advantages and characteristics thereof will become clearer on reading the following description given by way of non-limiting example and with reference to the appended drawings in which.

In all of these figures, identical references may designate identical or analogous elements.

DETAILED DESCRIPTION OF PREFERRED EMBODIMENTS

Figure 1:
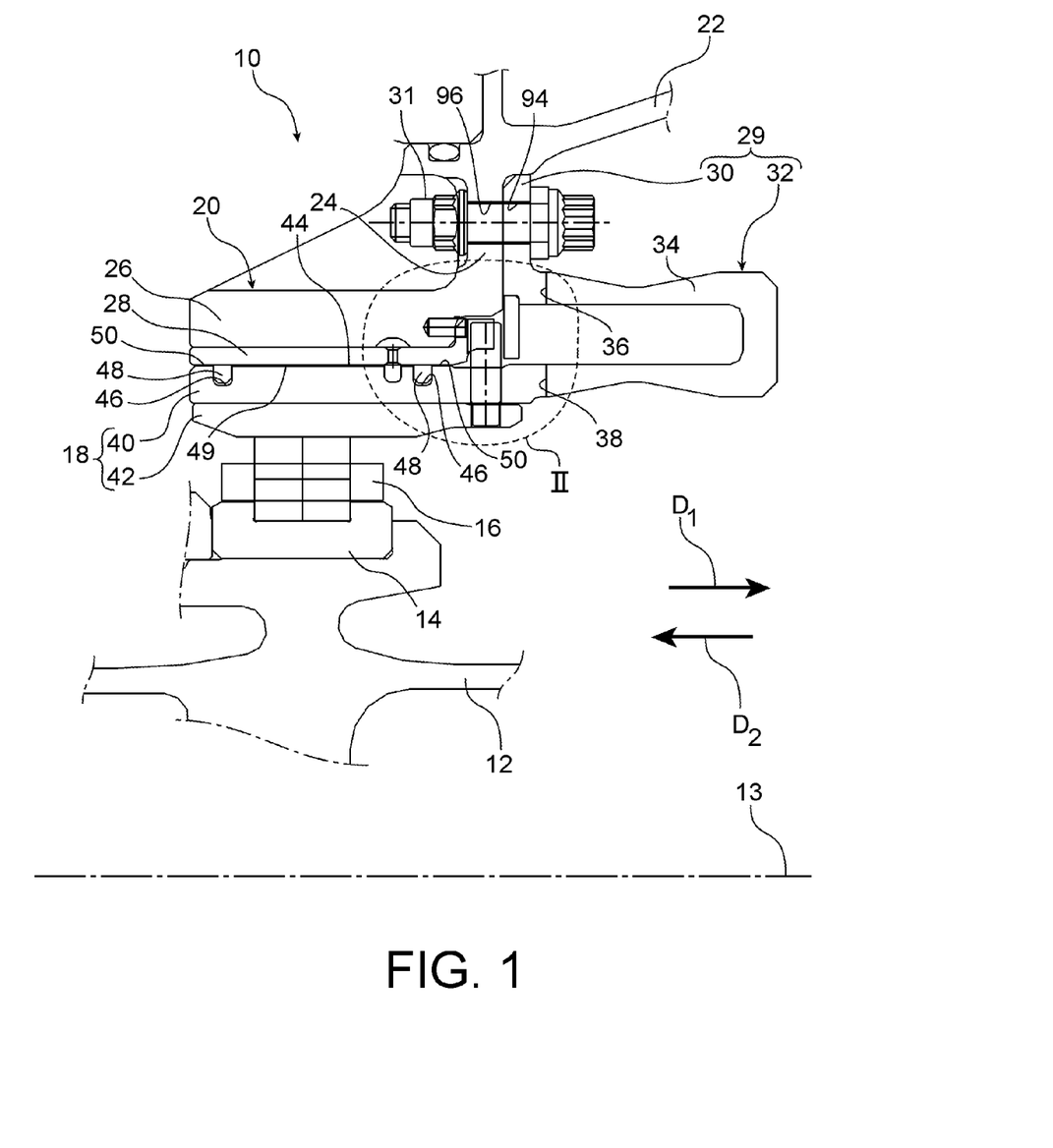
FIG. 1 is a schematic half-view in axial section of a device for centring and guiding the rotation of a turbine engine shaft, according to a first preferred embodiment of the invention.

FIG. 1 illustrates part of a device 10 for centring and guiding the rotation of a shaft 12 in a turbine engine, according to a first preferred embodiment of the invention.

In the description that follows, the "upstream" and "downstream" directions are defined with respect to a general direction of flow of gases parallel to an axis 13 of the shaft 12 corresponding to an axis of the turbine engine, and the "inwards" and "outwards" radial directions are defined with respect to the axis 13.

The device 10 includes a bearing formed of an inner race 14 integral with the shaft 12, a roller 16, and an outer race 18 integral with a bearing bracket 20 of globally annular shape.

The bearing bracket 20 comprises a frustoconical wall 22 intended to be coupled to a casing of the turbine engine or to another bearing bracket extending coaxially to the shaft 12, an annular flange 24 extending radially inwards from an upstream end of the frustoconical wall 22, and an upstream part 26 of cylindrical revolution extending upstream from a radially inner end of the annular flange 24.

The device 10 comprises a protecting ring 28 tightly mounted in the upstream part 26 of the bearing bracket 20.

The device 10 further comprises means 29 for coupling the outer race 18 to the bearing bracket 20. These means comprise an annular fastening flange 30 fastened for example by means of bolts 31 on the annular flange 24 of the bearing bracket, and elastically deformable means 32 constituted of an annular row of U-shaped splines or "small columns" 34 opened towards the upstream side, forming an assembly of the type commonly designated "flexible cage" or "squirrel cage". These splines 34 have an upper upstream end 36 coupled to the fastening flange 30, and a lower upstream end 38 coupled to the outer race 18 of the bearing.

In the example illustrated, the outer race 18 is formed of two coaxial parts, namely an annular support 40 coupled to the lower upstream end 38 of the splines 34, and a raceway 42 tightly mounted in the annular support 40. In a variant, the outer race 18 may be made of a single piece, as will become clearer hereafter.

The outer race 18 has a radially outer annular surface 44 of globally cylindrical revolution shape provided with two grooves 46 in which are housed respectively two annular sealing segments 48 axially delimiting an annular space 49 intended to receive a film of oil. In the example illustrated, the two grooves 46 are formed in the annular support 40 of the outer race 18 and are arranged between two cylindrical protrusions 50 of the outer race, commonly designated "abutment protrusions", in line with which the play between the outer race 18 and the protecting ring 28 defines the radial travel of the flexible bearing. This play is less than the thickness of the film of oil but sufficient to conserve the damping function thereof until the flexible bearing is in abutment under radial load.

The device 10 further comprises retaining means for axially retaining the outer race 18 in the event of breakage of the elastically deformable means 32, in particular in the event of breakage of one or more splines 34.

Figure 2:
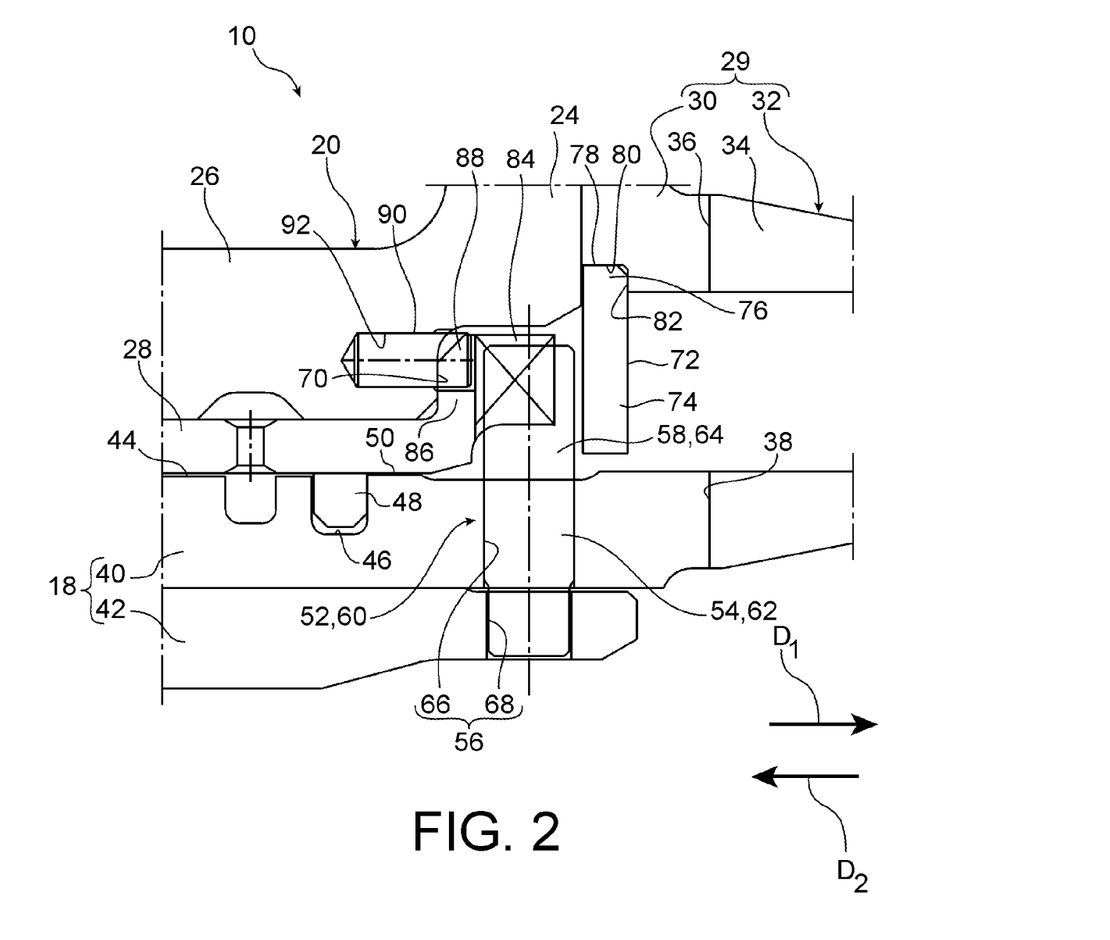
FIG. 2 is a larger scale view of detail II of FIG. 1.

FIG. 2 illustrates at larger scale the aforementioned retaining means.

According to the present invention, these retaining means include first means 52 separate from the protecting ring 28 and having a radially inner part 54 engaged in at least one recess 56 formed in the radially outer surface 44 of the outer race 18, and a radially outer part 58 that extends projecting radially outwards with respect to the radially outer surface 44 of the outer race 18. The retaining means further include a retaining element separate from the protecting ring and configured axially opposite the radially outer part 58 of the first means 52, as will become clearer hereafter.

In the first preferred embodiment of the invention, the first means 52 take the form of an annular row of retaining pins 60 each having a radially inner part 62 tightly mounted in the outer race 18, and a radially outer part 64 protruding from the radially outer surface 44 of the outer race 18. More precisely, the radially inner part 62 of each retaining pin 60 extends through a corresponding orifice 66 of the annular support 40, and has a radially inner end inserted into a corresponding orifice 68 of the raceway 42. This makes it possible to maintain the raceway 42 in place in the annular support 40 even in the event of loss of tightening between these two parts. Each orifice 68 of the raceway 42 has a diameter in section slightly smaller than the diameter in section of the corresponding orifice 66 of the annular support 40, and the radially inner part 62 of each retaining pin 60 has a narrowing of its section so as to block the retaining pin 60 in the inwards radial direction, to prevent the retaining pin 60 from coming out of its housing in the event of loss of tightening between the retaining pin 60 and the orifice 66, in order that it does not risk damaging the roller.

The respective radially outer parts 64 of the retaining pins 60 extend into an annular space delimited by a shoulder 70 formed at the base of the annular flange 24 of the bearing bracket.

In the first preferred embodiment of the invention, the aforementioned retaining element is a retaining ring 72 separate from the protecting ring 28 and having a radially inner part 74 extending at a distance from the outer race 18 and forming an abutment opposing the axial movement of the radially outer part 58 of the first means 52 in a first direction D1 oriented towards the elastically deformable means 32, in this case oriented downstream, and a radially outer part 76 axially interposed between the bearing bracket 20 and the fastening flange 30.

The retaining pins 60 thus extend axially opposite the radially inner part 74 of the retaining ring 72.

The retaining ring 72 is axially retained by the fastening flange 30 in the first direction D1, that is to say in the downstream direction. The retaining ring 72 thus forms an abutment opposing the axial movement of the first means 52 in the first direction D1.

Thus, it is clearly apparent that in the event of breakage of the elastically deformable means 32, the fastening flange 30 opposes an axial movement of the radially outer part 58 of the first means 52 in the first direction D1, whereas the annular flange 24 of the bearing bracket 20 opposes an axial movement of the radially outer part 58 of the first means 52 in a second direction D2 opposite to the first direction D1, in this case oriented upstream.

Obviously, the aforementioned first and second directions D1 and D2 may be reversed with regard to the upstream and downstream directions, provided the configuration of the device 10 according to the invention is also inverted.

In the example illustrated, the retaining ring 72 has a radially outer end 78 tightly mounted in an annular surface 80 of the fastening flange 30 delimited axially by an annular shoulder 82 of the fastening flange opposing an axial movement of the retaining ring 72 in said first direction D1, in this case downstream.

In the first preferred embodiment of the invention, an annular row of lugs 84 integral with the bearing bracket 20 is configured such that the radially outer part 64 of each of the retaining pins 60 is positioned between two of the lugs 84. In the example illustrated, the lugs 84 form the end of an extension 86 downstream of the protecting ring 28.

The cooperation of the lugs 84 with the retaining pins 60 thus makes it possible to limit the rotation of the outer race 18 in the event of breakage of the elastically deformable means 32.

The extension 86 of the protecting ring 28 comprises at least one recess 88 cooperating with a foolproofing pin 90 tightly mounted in an orifice 92 formed in the shoulder 70 of the bearing bracket 20. The foolproofing pin 90 makes it possible to index the angular position of the protecting ring 28, and thus the lugs 84, with respect to the bearing bracket 20. Preferably, each foolproofing pin 90 is substantially aligned with one of the retaining pins 60, which thus prevents it from coming out of its housing even in the event of loss of tightening with the orifice 92, so that it cannot then go and damage the roller. Furthermore, the angular indexation of the pins 60 with respect to the bearing bracket 20 is ensured by the referencing of the orifices 94 of the fastening flange 30 belonging to the coupling means 29 with the orifices 96 of the annular flange 24 belonging to the bearing bracket 20. Some of the orifices 94 and 96 are intended for the passage of bolts 31 whereas others of these orifices may be intended for the passage of lubricant inflow channels or ventilation channels, or instead intended to cooperate with tools for facilitating the separation of the coupling means 29 and the bearing bracket 20 during the dismantling of the device 10.

The device 10 of FIGS. 1 and 2 may be assembled in the following manner.

On the one hand, the foolproofing pin 90 is inserted into the orifice 92 of the bearing bracket 20 and is for example made integral with the bearing bracket 20 by a thermal expansion/contraction technique, then the protecting ring 28 is tightly mounted in the boring formed by the upstream part 26 of the bearing bracket 20, for example by thermal expansion/contraction. The putting in place of the protecting ring 28 is carried out by moving it upstream, that is to say in the second direction D2, while making sure to align angularly the recess 88 with the foolproofing pin 90, until the foolproofing pin 90 engages in the recess 88. A first solid assembly 98 visible in FIG. 3 and including the bearing bracket 20 and the protecting ring 28 is thereby obtained.

On the other hand, the outer race 18 is made integral with the coupling means 29. In the particular example described above, the outer race 18 is formed of two parts, namely the annular support 40 which is made from a single piece with the coupling means 29, and the raceway 42 which is shrink-fit mounted in the boring of the annular support 40, for example by thermal expansion/contraction.

Then, the retaining ring 72 is moved axially downstream around the outer race 18 and then is tightly mounted in the annular surface 80 of the fastening flange 30, also for example by thermal expansion/contraction.

At this moment, the radially inner part 74 of the retaining ring 72 is configured axially between the annular shoulder 82 of the fastening flange 30 and each recess 56 intended to receive the radially inner part 54 of the first means 52.

Then, the retaining pins 60 are moved radially from the exterior inwards and the respective radially inner parts 62 of the retaining pins 60 are mounted in the orifices 66, 68, for example by thermal expansion/contraction.

On the other hand, the sealing segments 48 are if need be put in place in the grooves 46 of the outer race 18.

Figure 4:
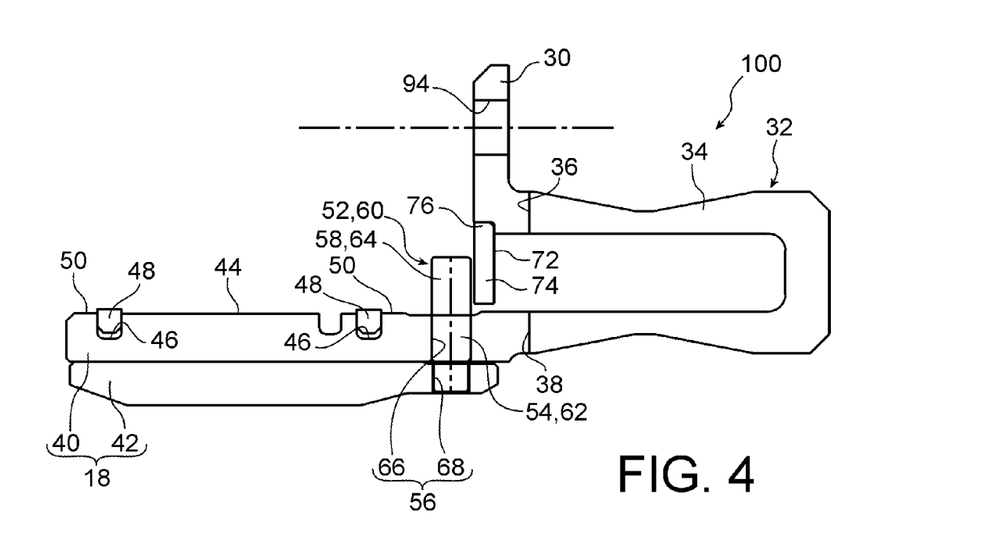
FIG. 4 is a schematic partial half-view in axial section of a second assembly formed by a bearing outer race and means intended for the coupling of the outer race to the bearing bracket, during the assembly of the device of FIG. 1.

Then, a second solid assembly 100 formed by the outer race 18, the coupling means 29, the retaining ring 72, the retaining pins 60 and the sealing segments 48 (FIG. 4) is positioned angularly so as to make the orifices 94 of the fastening flange 30 correspond with the orifices 96 of the annular flange 24 of the bearing bracket 20. Then this second solid assembly 100 is moved axially upstream until the outer race 18 is surrounded by the upstream part 26 of the bearing bracket 20. When the fastening flange 30 is applied on the annular flange 24 of the bearing bracket 20, these two flanges are fastened together by means of bolts 31 (FIG. 1).

It should be noted that one or more mountings by thermal expansion/contraction may be replaced by bonding, crimping, screwing mountings, or instead by welding, or any other suitable technique.

Figure 5:
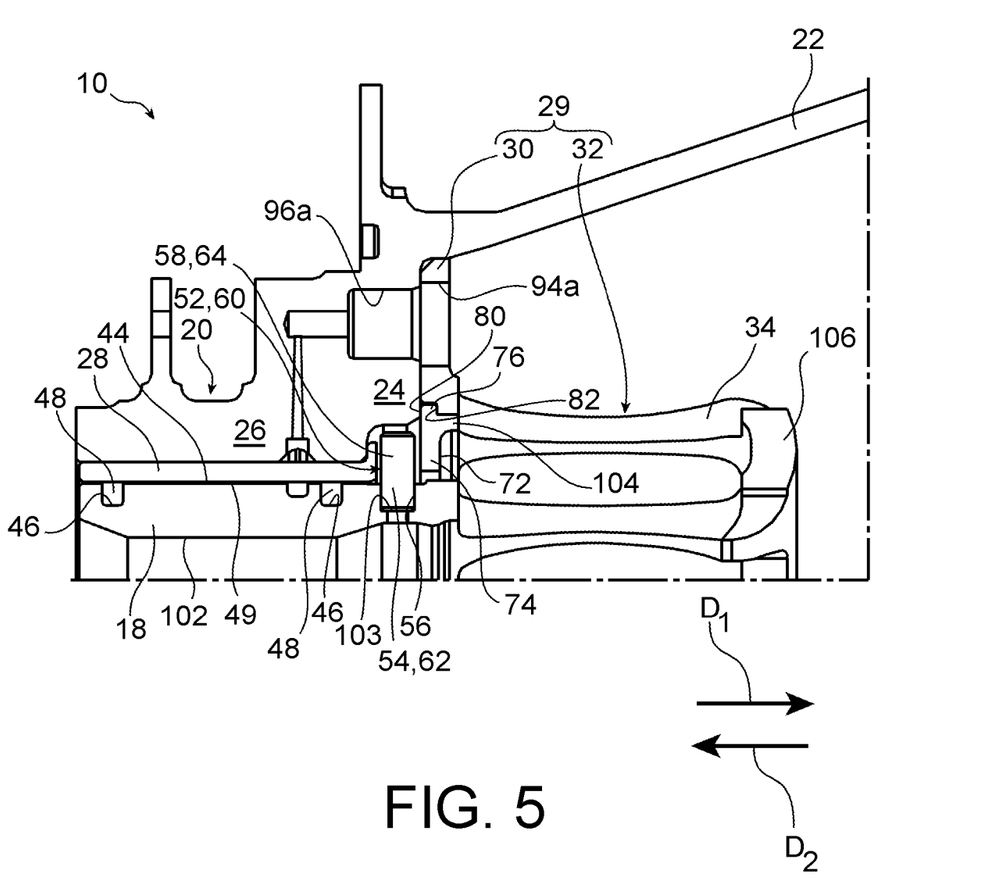
FIG. 5 is a schematic partial half-view in axial section of a device for centring and guiding the rotation of a turbine engine shaft, according to a second preferred embodiment of the invention.

FIG. 5 illustrates a second preferred embodiment of the invention globally similar to the first embodiment described above, but in which the protecting ring 28 is devoid of any downstream extension, and thus devoid of lugs capable of blocking the retaining pins in the tangential direction.

In addition, in the example illustrated in FIG. 5 as well as in the following examples, the outer race 18 is formed of a single part having the radially outer annular surface 44 and a radially inner surface 102 forming raceway. In this case, the recess(es) 56 may be through or blind. In the example of FIG. 5, for reasons of manufacturing simplicity, the recesses 56 take the form of through orifices provided with a narrowing of section 103 making it possible to guarantee the retention of the retaining pins 60 in the inwards radial direction.

Moreover, in this example, the retaining ring 72 comprises an axial collar 104 making it possible to reinforce its connection with the coupling means 29.

Finally, in the example illustrated in FIG. 5 as well as in the following examples, the elastically deformable means 32 include a reinforcing ring 106 connecting the respective downstream ends of the splines 34. Such a reinforcing ring could obviously equip the device of FIG. 1.

It should be noted that the orifice 94a of the fastening flange 30 and the orifice 96a of the annular flange 24 visible in FIG. 5 are not orifices for the passage of a bolt 31 but orifices for the circulation of the oil intended to form the film of oil between the protecting ring 28 and the outer race 18.

Figure 6:
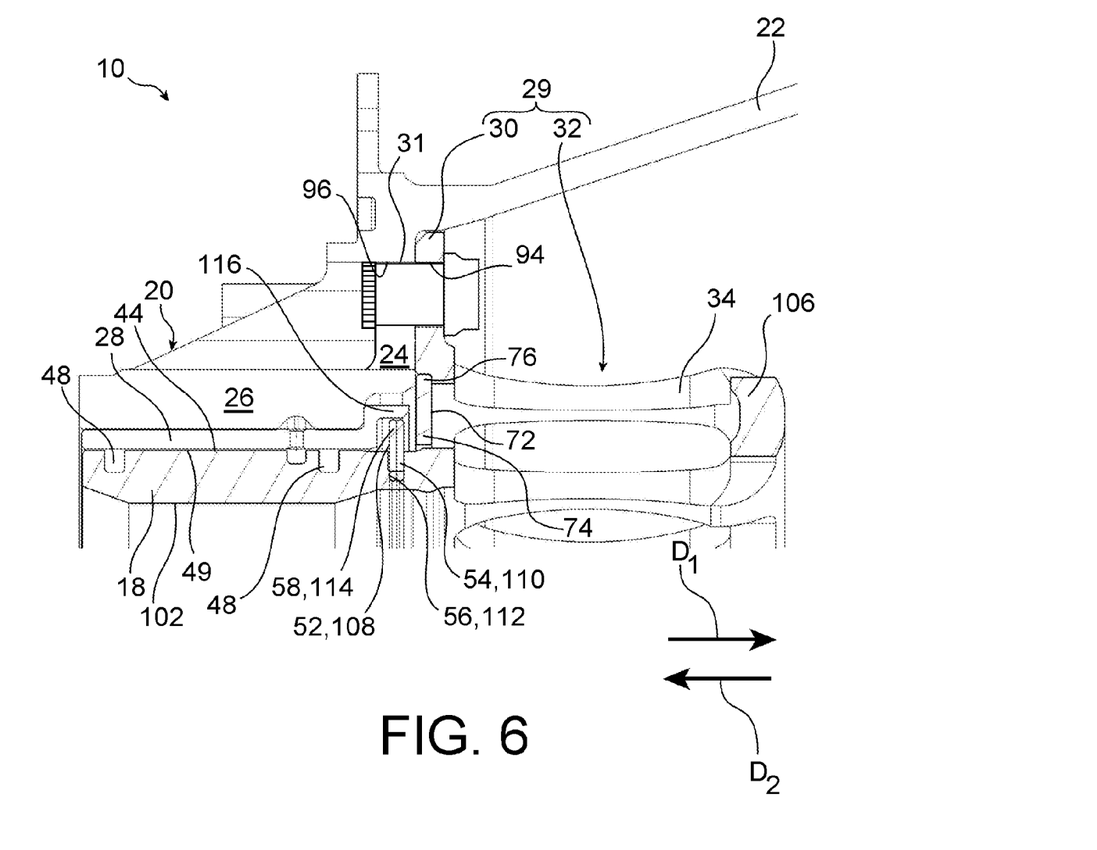
FIG. 6 is a schematic partial half-view in axial section of a device for centring and guiding the rotation of a turbine engine shaft, according to a third preferred embodiment of the invention.

FIG. 6 illustrates a third preferred embodiment of the invention, globally similar to the first embodiment described above, but in which the first means 52 do not take the form of an annular row of retaining pins but take the form of an annular element 108 having a radially inner part 110 engaged in an annular groove 112 of the outer race 18, and a radially outer part 114 protruding from the radially outer surface 44 of the outer race so as to extend axially opposite the radially inner part 74 of the retaining ring 72.

The annular element 108 takes for example the form of an elastic ring, that is to say a split and pre-stressed metal ring.

The mounting of the annular element 108 then takes place by opening of this element for the time to move it downstream around the outer race 18, then by releasing the annular element when said element is located in line with the annular groove 112 such that the annular element engages in the annular groove 112.

In addition, in order to limit the risks of disengagement of the annular element 108, the protecting ring 28 comprises an extension 116 downstream, which covers a radially outer end of the annular element 108 when the latter is engaged in the annular groove 112.

Figure 7:
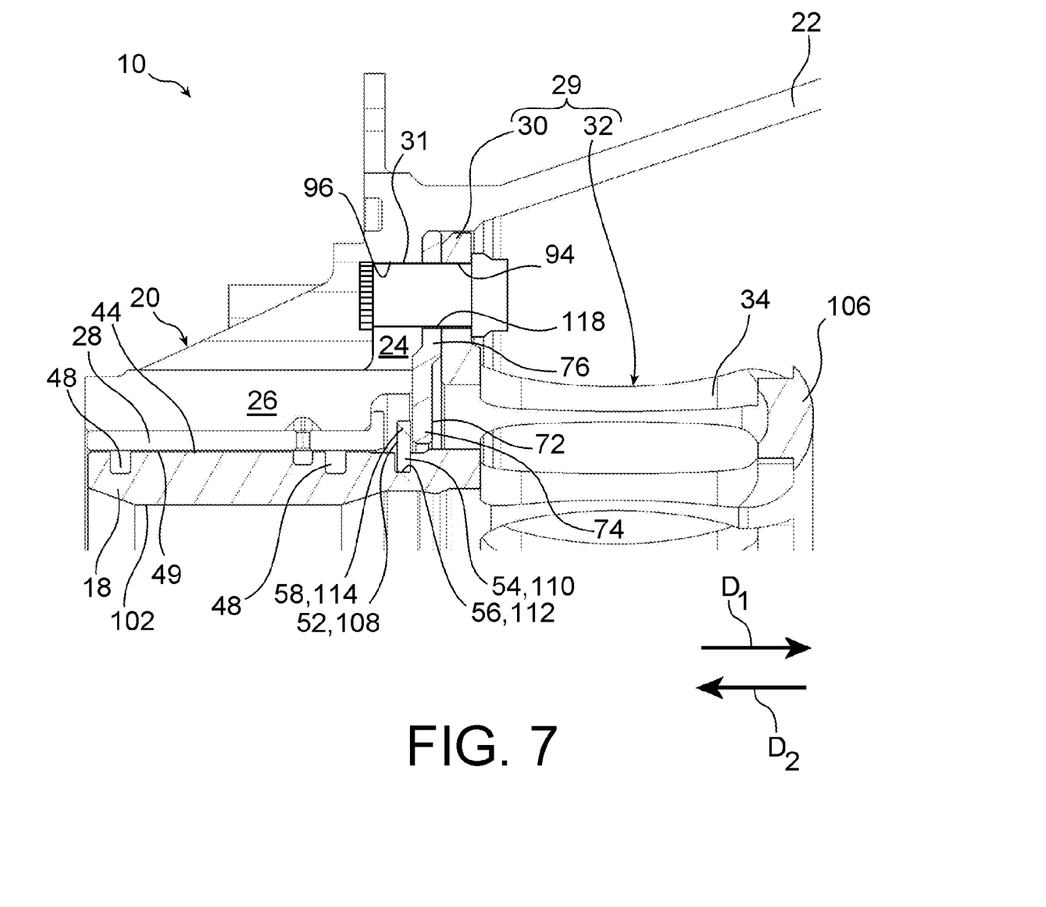
FIG. 7 is a schematic partial half-view in axial section of a device for centring and guiding the rotation of a turbine engine shaft, according to a fourth preferred embodiment of the invention.

FIG. 7 illustrates a fourth preferred embodiment of the invention, globally similar to the third embodiment described above, but in which the radially outer part 76 of the retaining ring 72 is provided with orifices 118 traversed by bolts 31 ensuring the fastening of the fastening flange 30 to the bearing bracket 20.

As an illustration, the radially outer part 76 of the retaining ring 72 extends radially outwards up to the level of a radially outer end of the fastening flange 30.

In the example illustrated, the protecting ring 28 is without extension downstream analogous to the extension 116 of FIG. 6.

The assembly of the device according to this fourth embodiment is carried out in an analogous manner to the assembly of the device according to the third embodiment of the invention, except as regards the retaining ring 72 which is not tightened in the fastening flange 30, but which is simply arranged around the outer race 18, near to the fastening flange 30, preferably in contact therewith, before the first means 52 are engaged in the recess 56. In the example illustrated, the engagement of the first means 52 consists in the engagement of the radially inner part 110 of the annular element 108 in the annular groove 112 of the outer race 18.

The first means 52 then make it possible to retain axially the retaining ring 72 as long as the aforementioned second solid assembly is not fastened to the first solid assembly by means of bolts 31.

Figure 8:
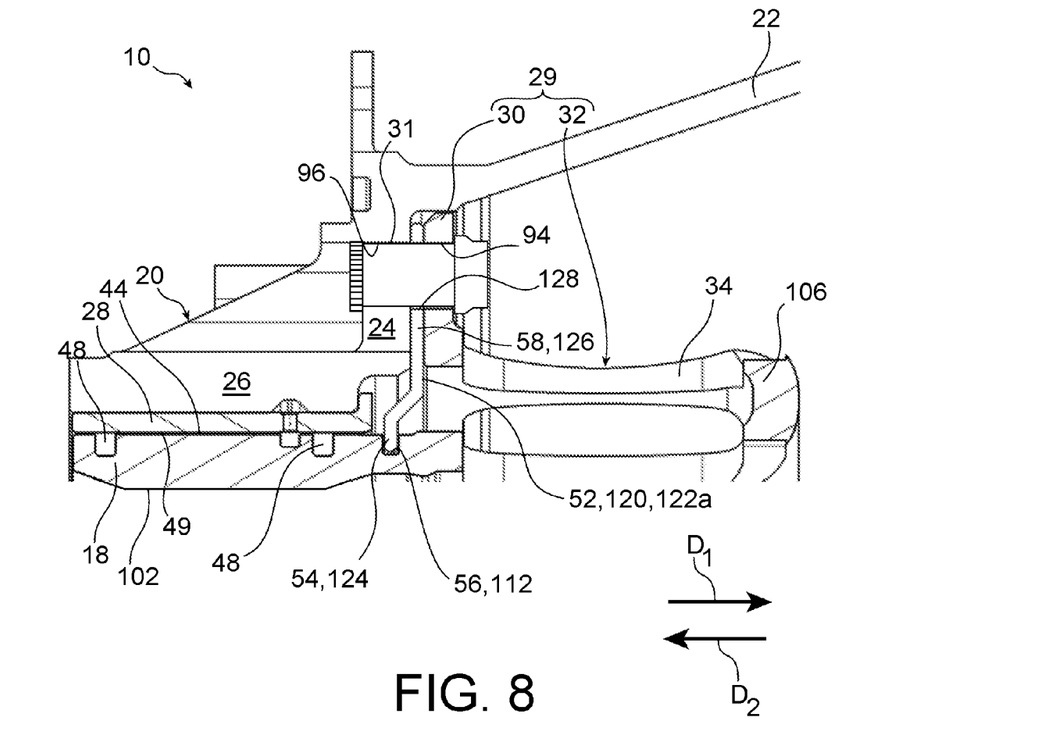
FIG. 8 is a schematic partial half-view in axial section of a device for centring and guiding the rotation of a turbine engine shaft, according to a fifth preferred embodiment of the invention.

FIG. 8 illustrates a fifth preferred embodiment of the invention, globally similar to the fourth embodiment described above, but in which the aforementioned retaining element is said fastening flange 30, and the first means 52 take the form of a ring 120 formed of at least two ring segments 122a, 122b (FIG. 9) mounted end-to-end circumferentially and having a radially inner part 124 engaged in the annular groove 112 of the outer race 18 (FIG. 8), and a radially outer part 126 provided with orifices 128 traversed by components for fastening the fastening flange 30 to the bearing bracket 20, that is to say in the example illustrated, by bolts 31.

In the device 10 according to this fifth embodiment, the retaining element is thus not constituted of a retaining ring independent of the first means 52 as is the retaining ring 72 of FIGS. 1 to 7.

The ring 120 forming said first means fulfils both the function of retention of the outer race 18 and the function of retention vis-à-vis the bearing bracket 20 and the fastening flange 30 belonging to the coupling means 29.

Figure 9:
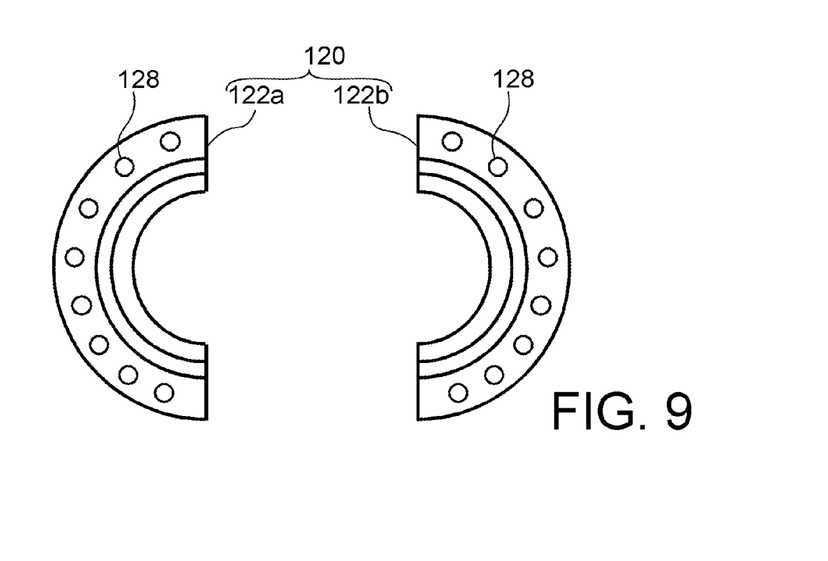
FIG. 9 is a schematic partial facing view of two ring segments intended to form a ring of the device of FIG. 8.

The assembly of the device 10 of FIG. 8 is globally similar to the assembly of the devices described above, but the putting in place of the first means 52 includes the positioning of the ring segments 122a, 122b around the outer race 18 so as to engage these ring segments in the annular groove 112 while angularly positioning the ring segments so as to align their orifices 128 with corresponding orifices 94 of the fastening flange 30. Then the bolts 31, or fastening components of any other suitable type, are inserted through the orifices 94 and 128 in order to retain radially the ring segments 122a, 122b.

The second solid assembly thereby formed may then be assembled with the bearing bracket 20 in the manner described above.

In all of the embodiments of the invention described above, the aforementioned retaining means make it possible to ensure a retention of the outer race 18 in the two opposite axial directions D1, D2. Due to the fact that the retaining element 72, 30 which ensures the retention of the first means 52 in the first direction D1 is an element separate from the protecting ring 28 integral with the bearing bracket, the assembly of the device may be carried out in a particularly straightforward and efficient manner.

The invention claimed is:
1. A device for centring and guiding the rotation of a turbine engine shaft, including:
a rolling bearing including an outer race;
a bearing bracket surrounding the outer race;
a protecting ring interposed between the outer race and the bearing bracket;
means for coupling the outer race to the bearing bracket, the coupling means including an fastening flange of annular shape mounted on the bearing bracket and elastically deformable means connecting the outer race to the fastening flange; and
retaining means for axially retaining the outer race in the event of breakage of said elastically deformable means;
wherein the retaining means include:
first means separate from the protecting ring and having a radially inner part engaged in at least one recess formed in a radially outer surface of the outer race, and a radially outer part that extends projecting radially outwards with respect to the radially outer surface of the outer race such that in the event of breakage of the elastically deformable means, the fastening flange opposes an axial movement of said radially outer part of the first means in a first direction oriented towards the elastically deformable means, and the bearing bracket opposes an axial movement of said radially outer part of the first means in a second direction opposite to the first direction, and
a retaining element separate from the protecting ring and configured axially opposite the radially outer part of the first means so as to form an abutment opposing the axial movement of the first means in said first direction.

2. The device according to claim 1, in which the retaining element is a retaining ring separate from the protecting ring and having a radially inner part extending at a distance from the outer race and forming an abutment opposing the axial movement of said radially outer part of the first means in said first direction in the event of breakage of the elastically deformable means, and a radially outer part interposed axially between the bearing bracket and the fastening flange.

3. The device according to claim 2, in which the retaining ring has a radially outer end tightly mounted in an annular surface of the fastening flange delimited axially by an annular shoulder of the fastening flange opposing an axial movement of the retaining ring in said first direction.

4. The device according to claim 2, in which the radially outer part of the retaining ring is provided with orifices traversed by components for fastening the fastening flange to the bearing bracket.

5. The device according to claim 2, in which the first means take the form of a plurality of retaining pins each having a radially inner part tightly mounted in a corresponding orifice of the outer race, and a radially outer part protruding from the radially outer surface of the outer race so as to extend axially opposite the radially inner part of the retaining ring.

6. The device according to claim 5, in which the radially outer part of each of the retaining pins is positioned between two corresponding lugs integral with the bearing bracket, such that the lugs limit the rotation of the outer race in the event of breakage of the elastically deformable means.

7. The device according to claim 2, in which the first means take the form of an annular element having a radially inner part engaged in an annular groove of the outer race, and a radially outer part protruding from the radially outer surface of the outer race so as to extend axially opposite the radially inner part of the retaining ring.

8. The device according to claim 1, in which the retaining element is said fastening flange, and the first means take the form of a ring formed of at least two ring segments mounted end-to-end circumferentially and having a radially inner part engaged in an annular groove of the outer race, and a radially outer part provided with orifices traversed by components for fastening the fastening flange to the bearing bracket.

9. A turbine engine, comprising at least one device according to claim 1.

10. A method of assembling a device according to claim 1, comprising:
   providing a first solid assembly formed by the bearing bracket and the protecting ring mounted beforehand in the latter,
   providing the outer race and the coupling means integral with the outer race as well as the retaining element;
   moving said first means radially from the outside inwards with respect to an axis of revolution of the outer race, so as to insert said radially inner part of the first means in the or each corresponding recess formed in the outer race, and thereby obtain a second solid assembly including the outer race, the coupling means, the retaining element and the first means, then
   moving the second solid assembly with respect to said first solid assembly until the outer race is surrounded by the bearing bracket, then
   fastening said fastening flange on the bearing bracket.

11. The method according to claim 10, wherein the retaining element is a retaining ring separate from the protecting ring and having a radially inner part extending at a distance from the outer race and forming an abutment opposing the axial movement of said radially outer part of the first means in said first direction in the event of breakage of the elastically deformable means, and a radially outer part interposed axially between the bearing bracket and the fastening flange, the method further including the step consisting in putting in place the retaining ring around the outer race prior to the step of movement and insertion of the first means in the outer race, such that said radially inner part of the retaining ring is configured axially between at least one part of the fastening flange and the or each recess intended to receive the radially inner part of the first means.

* * * * *

UNITED STATES PATENT AND TRADEMARK OFFICE
CERTIFICATE OF CORRECTION

PATENT NO. : 9,708,931 B2
APPLICATION NO. : 15/037889
DATED : July 18, 2017
INVENTOR(S) : Regis Eugene Henri Servant et al.

Page 1 of 1

It is certified that error appears in the above-identified patent and that said Letters Patent is hereby corrected as shown below:

In the Specification

Column 4, Line 12, delete "or" after "the"

In the Claims

Column 11, Line 13, delete "or" after "the"

Column 12, Line 17, delete "or" after "the"

Signed and Sealed this
Fourteenth Day of May, 2019

Andrei Iancu
*Director of the United States Patent and Trademark Office*